(12) United States Patent
Pickett et al.

(10) Patent No.: US 8,727,698 B1
(45) Date of Patent: May 20, 2014

(54) ATMOSPHERIC ENERGY EXTRACTION DEVICES AND METHODS

(71) Applicant: Solar Wind Energy Tower, Inc., Annapolis, MD (US)

(72) Inventors: Ronald W. Pickett, Wrightsville Beach, NC (US); Stephen L. Sadle, Crownsville, MD (US)

(73) Assignee: Solar Wind Energy Tower, Inc., Annapolis, MD (US)

( * ) Notice: Subject to any disclaimer, the term of this patent is extended or adjusted under 35 U.S.C. 154(b) by 0 days.

(21) Appl. No.: 13/947,625

(22) Filed: Jul. 22, 2013

(51) Int. Cl.
*F03D 9/00* (2006.01)

(52) U.S. Cl.
USPC .............................................. 415/1; 415/909

(58) Field of Classification Search
USPC .......... 415/1, 2.1, 4.1, 118, 143, 909; 290/44, 290/55
See application file for complete search history.

(56) References Cited

U.S. PATENT DOCUMENTS

| | | | | |
|---|---|---|---|---|
| 1,600,105 | A | * | 9/1926 | Fonkiewicz ................. 415/142 |
| 3,815,371 | A | * | 6/1974 | Koehler ...................... 405/227 |
| 4,036,916 | A | * | 7/1977 | Agsten ........................ 261/109 |
| 4,452,046 | A | | 6/1984 | Valentin |
| 4,742,682 | A | * | 5/1988 | Assaf et al. ................. 60/641.1 |
| 5,284,628 | A | * | 2/1994 | Prueitt ......................... 422/168 |
| 6,510,687 | B1 | * | 1/2003 | Zaslavsky et al. ............. 60/398 |
| 6,647,717 | B2 | | 11/2003 | Zaslavsky et al. |
| 8,232,665 | B2 | | 7/2012 | Sato |
| 2006/0145367 | A1 | * | 7/2006 | Gasparini et al. ............. 261/109 |
| 2009/0260301 | A1 | | 10/2009 | Prueitt |
| 2011/0316279 | A1 | | 12/2011 | Bahari et al. |
| 2012/0261918 | A1 | | 10/2012 | Hanback |
| 2012/0274068 | A1 | * | 11/2012 | Hanback ........................ 290/44 |

FOREIGN PATENT DOCUMENTS

| | | | |
|---|---|---|---|
| JP | 54-108145 | * | 8/1979 |
| JP | 54-108145 A | * | 8/1979 |

OTHER PUBLICATIONS

Honma, Tower Wind Power Equipment, Aug. 24, 1979, Abstract of JP-108145.*
Honma, Tower wind power equipment, Aug. 24, 1979, Abstract of JP 54-108145A.*

* cited by examiner

*Primary Examiner* — Ned Landrum
*Assistant Examiner* — Liam McDowell
(74) *Attorney, Agent, or Firm* — Laubscher & Laubscher, P.C.

(57) ABSTRACT

An electricity generating tower includes a tower wall whose inner radius profile has a hyperbolic shape for a least a portion thereof. Moisture is added to the top of the tower and mixes with air to generate a downdraft of wind within the interior of the tower. A base beneath the tower wall contains a plurality of radially extending wind tunnels each having a turbine arranged therein to convert the wind into electricity.

13 Claims, 16 Drawing Sheets

```
           START
             │
             ▼
   MEASURE CAPTURED WIND                    ─ 910
             │
             ▼
   ADJUST EXTERNAL SPRAY                    ─ 912
             │
             ▼
   MEASURE/CALCULATE AVAILABLE CAPTURED WIND ─ 914
   ENERGY
             │
             ▼
   MEASURE ATMOSPHERIC CONDITIONS           ─ 920
             │
             ▼
   ADJUST INTERNAL SPRAY                    ─ 922
             │
             ▼
   MEASURE/CALCULATE AVAILABLE GENERATED WIND ─ 924
   ENERGY
             │
             ▼
   CONFIGURE SHUNTS                         ─ 930
```

FIG. 9

ATMOSPHERIC ENERGY EXTRACTION DEVICES AND METHODS

FIELD OF THE INVENTION

This disclosure relates to methods and systems for extracting energy from hot atmospheric air and/or wind.

BACKGROUND OF THE INVENTION

The idea of creating electrical energy from environmental forces, such as wind, ocean currents and tides, and hot/dry air is not new. Unfortunately, such environmental forces tend to be unreliable in intensity or cyclical in their nature. For example, windmills are often subjected to wind speeds varying by orders of magnitude in a given day. While the fundamental notions of converting mechanical energy from the environment are sound, efficiently capturing such mechanical energy and converting it to electrical energy poses many practical problems that often have not been addressed.

BRIEF DESCRIPTION OF THE PRIOR ART

U.S. Pat. No. 4,452,046 to Valentin discloses a conversion tower that converts incident wind into a cyclonic fluid flow that may include a downdraft component. U.S. Pat. No. 6,647,717 to Zaslayski, et al., discloses a tower for generating power having a cylindrical sidewall. U.S. Pat. No. 8,232,665 to Sato teaches vanes that redirect incident wind to a bottom of a cylindrical tower. U.S. Published Application No. 2011/0316279 to Bahari, et al., discloses the conversion of incident horizontal wind into a downdraft flow in order to drive a turbine remotely located from the incident wind. U.S. Published Application No. 2009/0260301 to Prueitt teaches a water spraying system to create a downdraft in a cylindrical tower to turn turbines.

Commonly assigned U.S. patent application Ser. No. 13/414,569, published as 2012/0261918, and Ser. No. 13/098,476, published as 2012/0274068, are incorporated herein by reference. These patent applications disclose adding moisture at the top of a cylindrical tower to hot-dry air so as to generate a downdraft of wind within the interior of the tower coupled with vanes on the exterior of the tower that redirect incident wind downwards.

However, the prior art fails to teach a tower configuration that optimizes the velocity of the downdraft of wind generated by the tower. In addition, the prior art towers feature cylindrical designs that require excessively thick tower walls, which unnecessarily increases the amount of material used in construction and the cost of construction. Prior art towers also provide inferior seismic and wind resistance.

SUMMARY OF THE INVENTION

Accordingly, it is an object of the present invention to provide a tower that more efficiently generates a downdraft of wind. Additional advantages of the present invention over previous energy towers include a reduced tower wall thickness for a given tower height and a more efficient construction. The present invention also offers increased seismic and wind force resistance over the prior towers. The present invention also allows for increased efficiency by providing greater circumferential area at the base, thereby allowing for the use of larger turbines.

Such an energy tower in accordance with embodiments of the invention includes a water injection system capable of adding moisture at a top of the tower to hot-dry air so as to generate a downdraft of wind within an interior of the tower to create a generated wind at the bottom of the tower. The tower further includes a base extending upwardly from a foundation surface and having an opening connected to a wind tunnel, the wind tunnel configured to receive the generated wind. In addition, a turbine positioned within the wind tunnel and configured to convert the generated wind into electricity. The tower of the invention is characterized by having a first wall portion with a profile that follows a hyperbolic shape. In further embodiments of the invention, the tower may have a second wall portion that follows a second hyperbolic shape.

In additional embodiments of the invention, the tower is characterized by having a circular tower wall extending upward from the base. The tower wall has a first interior radius at a bottom end and a second interior radius at a top end. The tower wall also has a throat positioned between the bottom end and the top end. The interior radius at the throat is smaller than both the bottom radius and the top radius. In further embodiments, a profile of an interior radius of the wall between the bottom and the throat follows a first hyperbolic shape, and a profile of an interior radius of the wall between the throat and the top follows a second, different hyperbolic shape

BRIEF DESCRIPTION OF THE FIGURES

Other objects and advantages of the invention will become apparent from a study of the following specification when viewed in the light of the accompanying drawing, in which:

FIG. 9 is a flowchart outlining an exemplary operation for efficiently converting mechanically captured energy into electricity;

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

Figure 1:
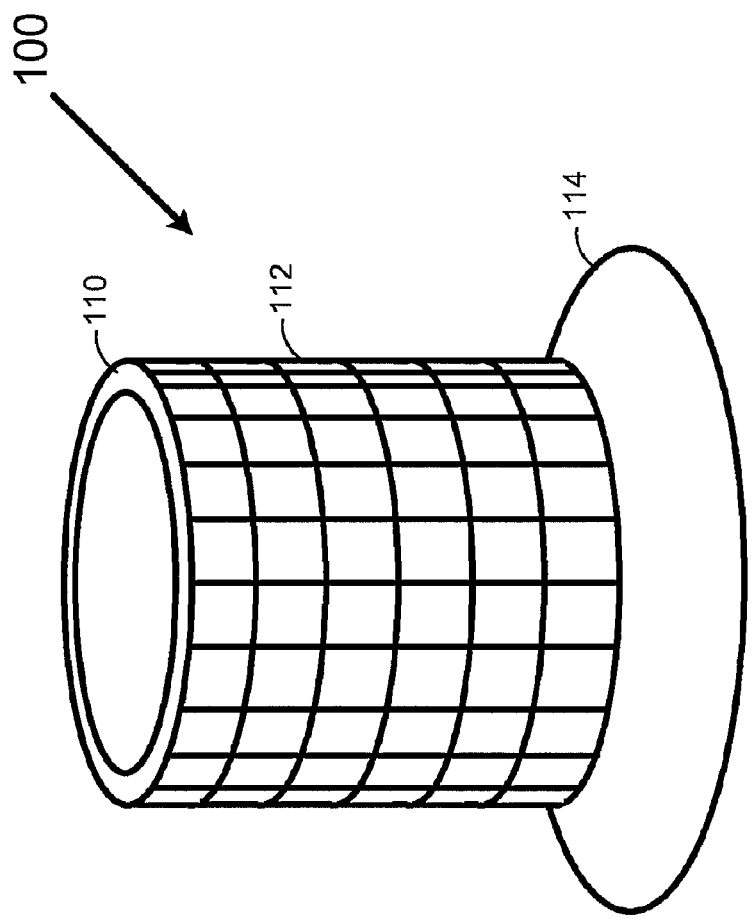
FIG. 1 is an energy tower capable of extracting energy from the atmosphere using multiple techniques.

FIG. 1 shows an illustrative embodiment of an energy tower 100 capable of extracting energy from the atmosphere using multiple techniques by generating downward winds—and thus wind energy—using hot-dry air. As shown in FIG. 1, the energy tower 100 includes an upper lip 110, a vertical member 112 and a base 114. The base 114 houses an array of wind tunnels and turbines as will be shown below. The lip, 110, vertical member 112 and base 114 cooperate to cause moisture-laden air to accelerate internal to the vertical member 112 into the individual wind tunnels (not shown) located in the base 114.

Figure 2:
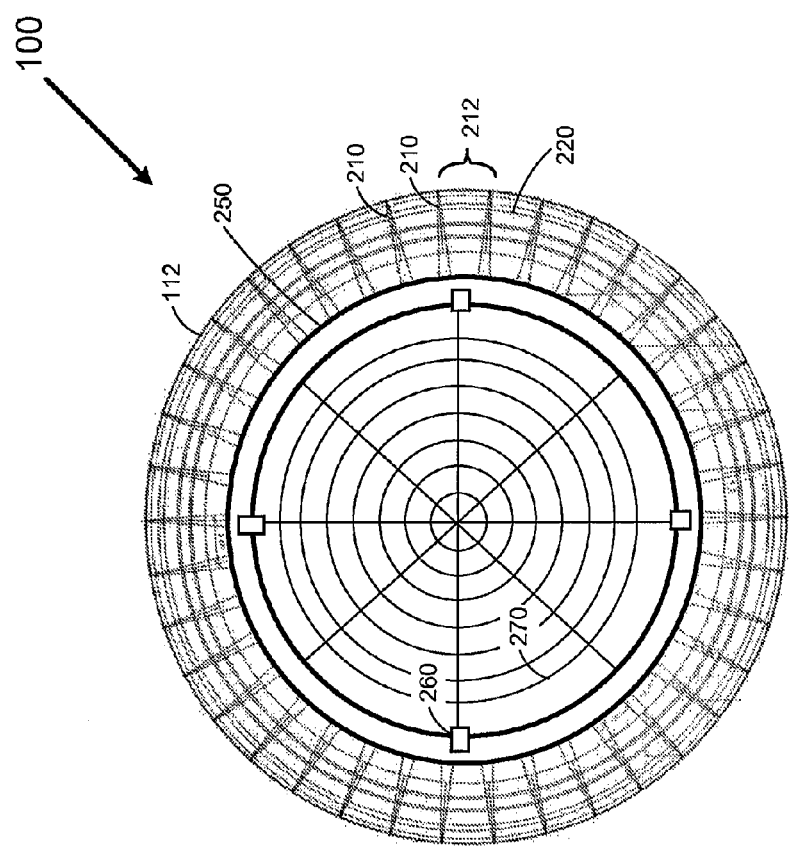
FIG. 2 is a plan view (cut-through) perspective of the energy tower of FIG. 1.

FIG. 2 is a top-down (cut-through) perspective of the energy tower 100 of FIG. 1. The energy tower 100 has a main cylindrical wall 250 whereby inside the cylindrical wall 250 downward wind drafts are generated by adding moisture to hot-dry air occurring at the top of the tower 100. Sensors 260 are located around the top perimeter of the energy tower 100, as well as along the inside walls throughout the height of the energy tower 100 (not shown). The sensors 260 may include any number of sensing devices and can be capable of measuring, for example, temperature, wind-speed, humidity, solar radiation, $CO_2$, and so on.

Moisture is added by a water injection system. The water injection system may include a series of sprinklers 270 located at or near the top of the tower 100 with the sprinklers 270 arranged in a radial web-like structure. In various embodiments, moisture can be controllably added to air as a function of the atmospheric conditions at the top of the tower 100 as measured by the sensors 260. For example, the moisture provided by the sprinklers 270 may be increased or decreased depending on the temperature and humidity of the atmosphere to maintain a particular wind speed at the bottom of the tower 100.

Figure 2B:
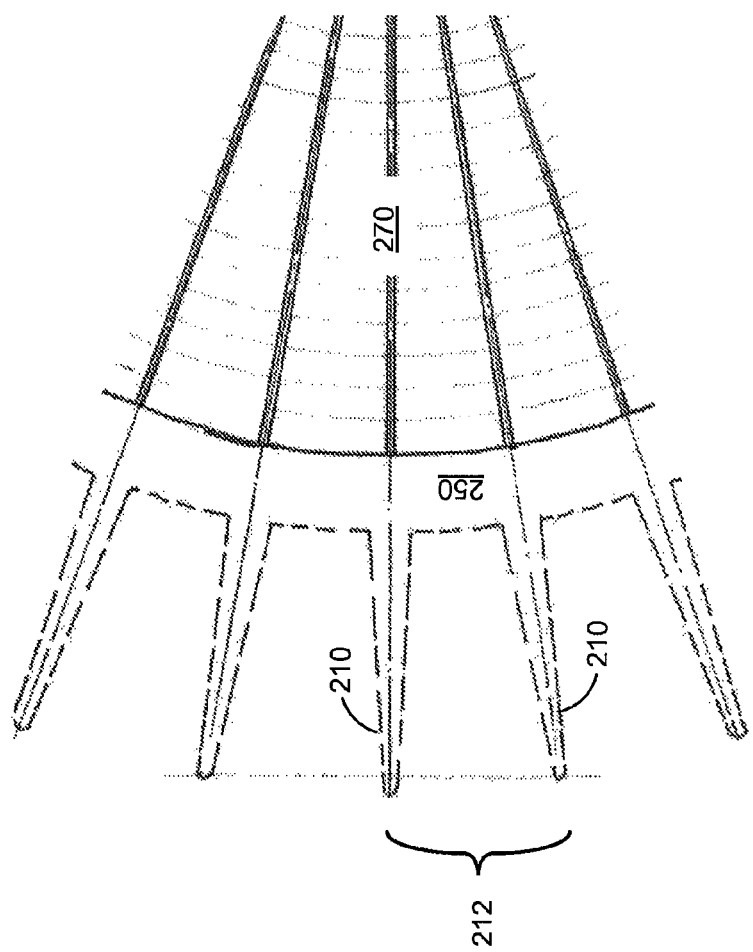
FIG. 2B depicts details of a section if the energy tower as shown in FIG. 2.

Outside the cylindrical wall 250 extend thirty-eight (38) vanes 210 that, with the cylindrical wall 250, define thirty-eight (38) vertically elongated air pockets 212 where incident wind may be captured and directed to one or more wind tunnels. To help direct incident wind, flaps 220 are incorporated within each pocket 212. FIG. 2B depicts details of the tower energy wall 250, vanes 210, air pockets 212, and sprinkler system with sprinklers 270. To help accelerate wind in the air pockets 212, moisture may be added as be further explained below.

It is to be appreciated in light of the present specification that the vanes 210 have at least two functions: (1) to add structural integrity to the energy tower 100 as a buttress, and (2) to provide an additional form of energy generation by way of capturing wind energy. In this sense, the vanes provide two novel improvements over previously conceived/conventional energy towers.

For the purposes of this disclosure, wind developed within the energy tower 100 shall be referred to as "generated wind" while incident wind captured and channeled by the various air pockets 212 shall be referred to as "captured wind." Also, the term "incident wind" is used to denote naturally occurring wind making contact with the exterior of the energy tower 100.

Figure 3:
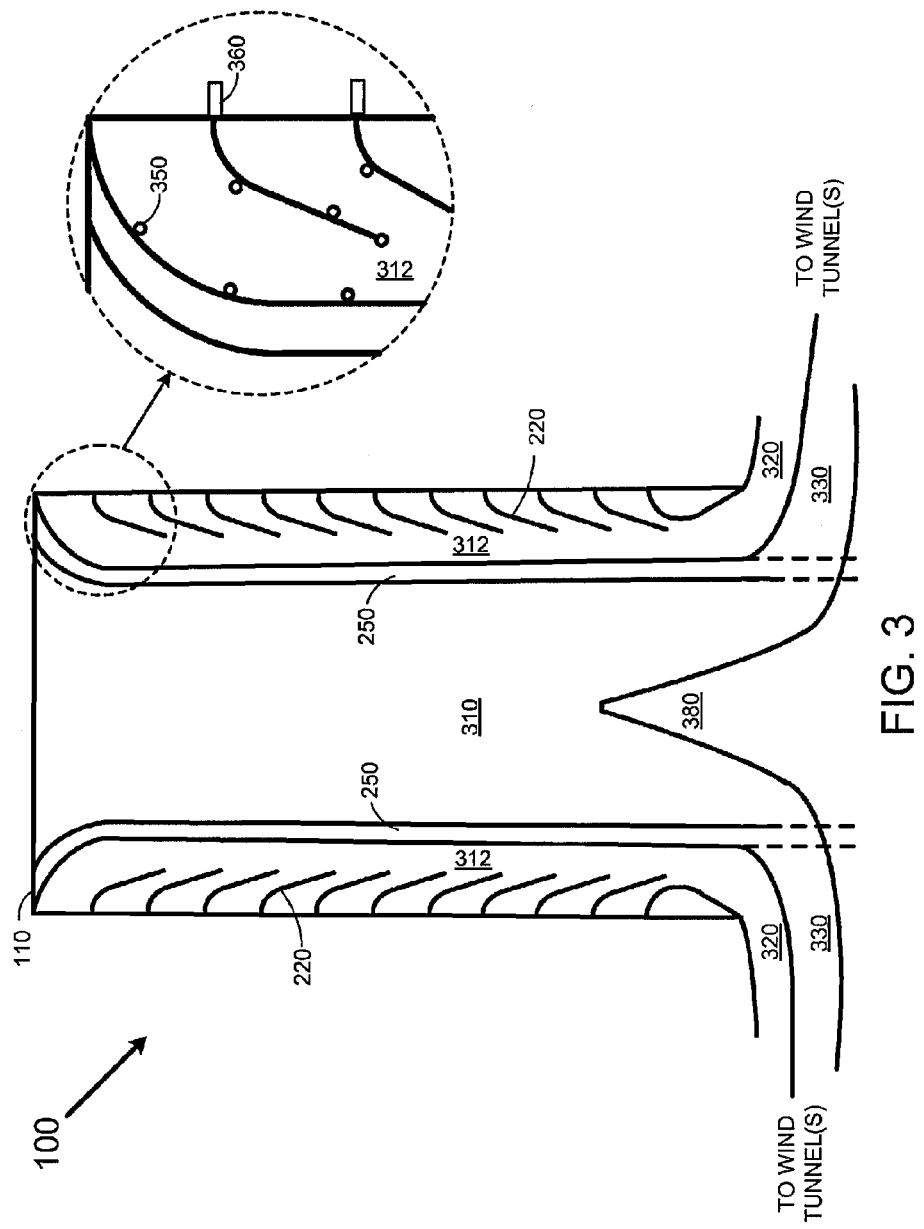
FIG. 3 is a side view (cut-through) perspective of the energy tower of FIG. 1.

FIG. 3 is a side view (cut-through) perspective of the energy tower 100 of FIG. 1 better displaying the wind-directing flaps 220 and channels 312 with each air pocket 212, as well as the interior 310 of the energy tower 100 and wind-directing channels 320 and 330, which are used to channel wind to wind-capturing turbines (not shown in FIG. 3) as will be further explained below. As shown in the upper-right-hand side of FIG. 3, sensors 360 are placed adjacent to the flaps 220, and water sprinklers 350 are added to the backside of the channel 312 and to the flaps 220. In various embodiments, the sprinklers may alternately be arranged as a web similar to the sprinkler system 270 shown in FIG. 2. The water sprinklers 350 are configured to controllably add moisture to the interior of each air pocket 212 such that captured wind may be controllably accelerated to the bottom of the air pocket 212. As with the interior wind-generated winds, the water sprinklers 350 may controllably add water as a function of atmospheric conditions as measured by the sensors 360, which may be configured to measure all or some of wind-speed, temperature, humidity, etc., as well as sensed conditions within channels 312 and 320 by other sensors (not shown).

In various embodiments, the base of tower 100 may be shaped as a diffuser 380 to help generate downdraft wind flow into wind-directing channels 330 with better efficiency.

Figure 4:
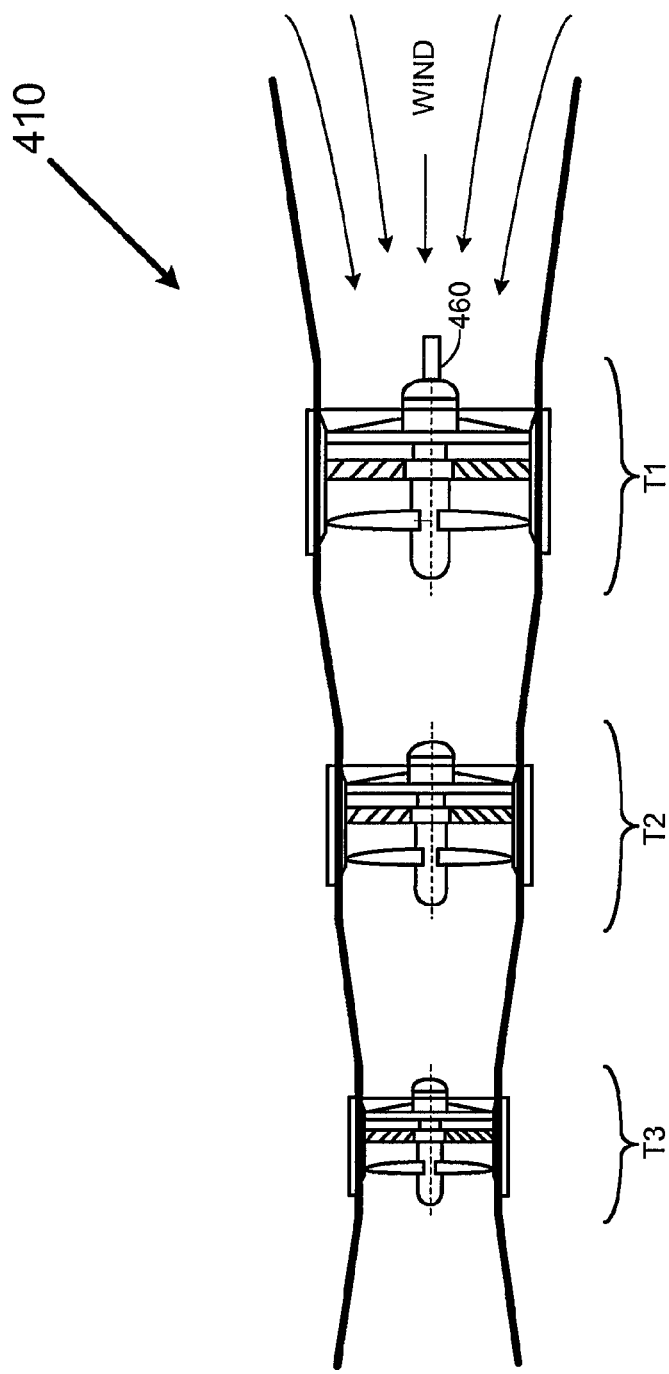
FIG. 4 is a wind tunnel used with the energy tower of FIG. 1.

FIG. 4 is an energy-capturing wind tunnel 410 used with the energy tower of FIG. 1. The wind tunnel 410 includes a wind turbine T1, and may include additional wind turbines T2 and T3 (with optionally one or more additional turbines possibly placed in line with turbines T1-T3). In operation, wind may flow from right-to-left through turbines T1 through T3 with each turbine T1-T3 extracting some measure of energy from the air with energy availability being proportional to the cube of wind speed at each turbine T1-T3. Assuming that approximately 50% of energy may be extracted by each turbine, it may be advantageous to make the wind-swept area of the blades of turbine T2 half that of turbine T1, and to make the wind-swept area of the blades of turbine T3 half that of turbine T2, and so on. Should energy extraction vary from 50%, the ratios of the wind-swept area of the blades of the various turbines may change accordingly. In the example of FIG. 1, the various turbines T1-T3 may each include a fixed displacement or variable displacement hydraulic pump capable of pumping fluid from a low-pressure line (LPL) to a high-pressure line (HPL). While the various turbines are coupled to the same LPL and HPL, in various embodiments the various turbines T1-T3 may be designed to have independent hydraulic systems (with separate generator arrays) or hydraulic systems that are capable of being coupled/decoupled under control of a controller or some other decision maker.

Sensors 460 are added to facilitate control of the moisture adding process as discussed above. In various embodiments, one of the turbines T1, T2 or T3 may be used as a sensor for measuring air speed.

Figure 5:
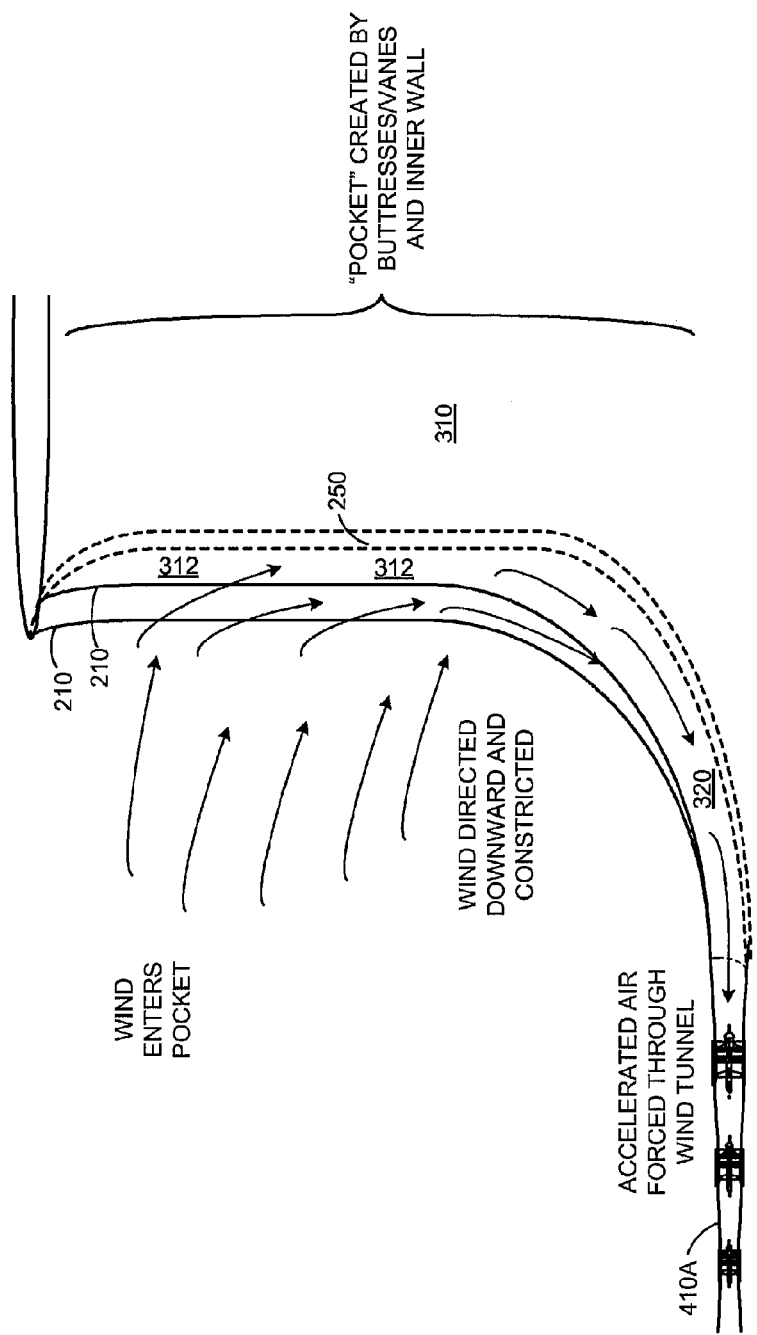
FIG. 5 depicts the exterior wind-capture structures of the energy tower of FIG. 1.

FIG. 5 depicts the exterior wind-capture structures of the energy tower 100 of FIG. 1. It may be appreciated that the outside of the exemplary energy tower 100 is modified in a novel manner to capture and redirect incident wind downward by virtue of the vanes 210 and flaps 220 (not shown on FIG. 5 for clarity) to a set of wind tunnels 410A while at the same time improved structural integrity may be had much in the way buttresses or flying buttresses were made to improve structural integrity of older structures. As shown in FIG. 5, two vanes/buttresses 210 are shown extending from wall 250. The resultant wind pocket/sail defined by the wall 250 and vanes/buttresses 210 receive incident wind and direct it downward where the redirected wind is constricted and accelerated (again—the Venturi effect) into channel 320 and fed into wind tunnel 410A. As discussed above, moisture may (optionally) be added in channels 312—either in a fixed or in a controllable fashion depending on incident wind conditions, in order to control wind speed as the captured and accelerated air enters channels 320.

Figure 6:
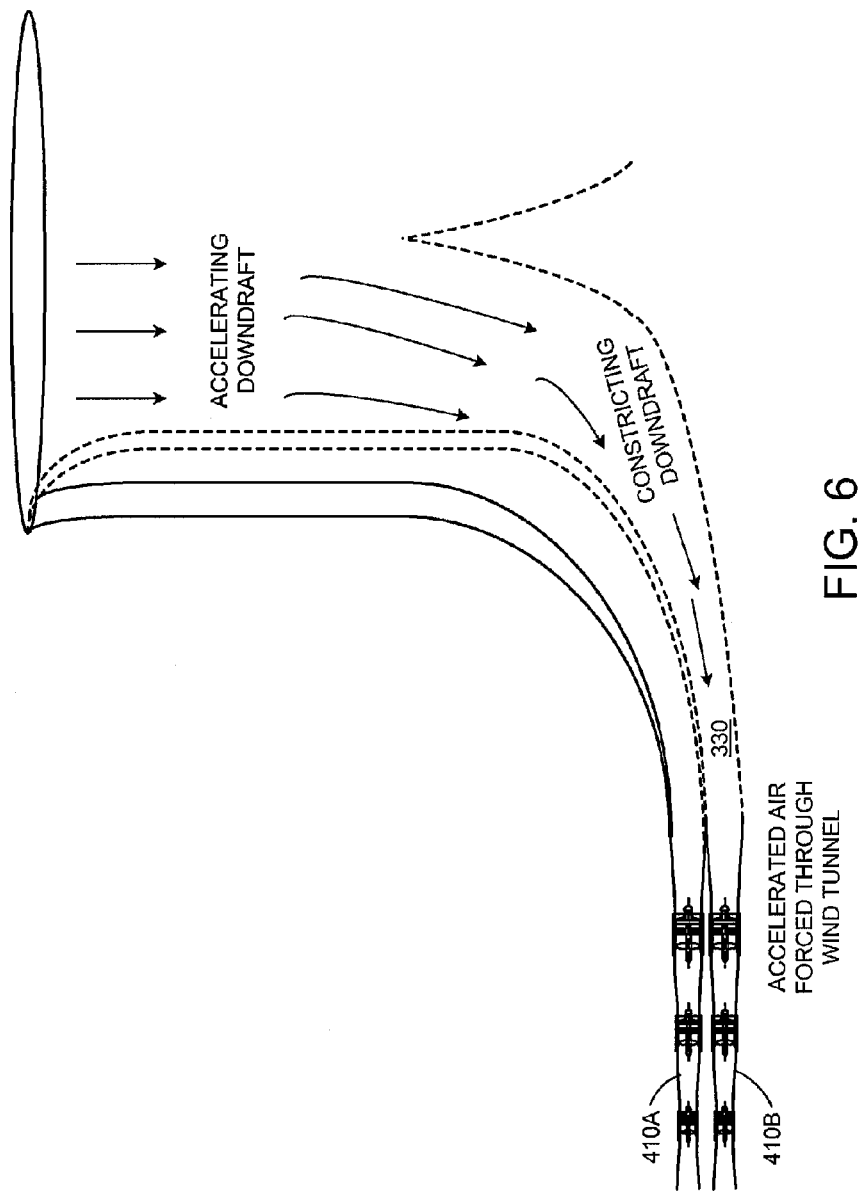
FIG. 6 depicts the interior atmospheric wind-generation of the energy tower of FIG. 1.

FIG. 6 depicts the interior atmospheric wind-generation of the energy tower of FIG. 1. As discussed above, moisture is controllably combined with hot-dry air at the top of the energy tower 100 to generate accelerating downdraft winds, which are constricted into channel 330 and fed into wind tunnel 410B.

Figure 7:
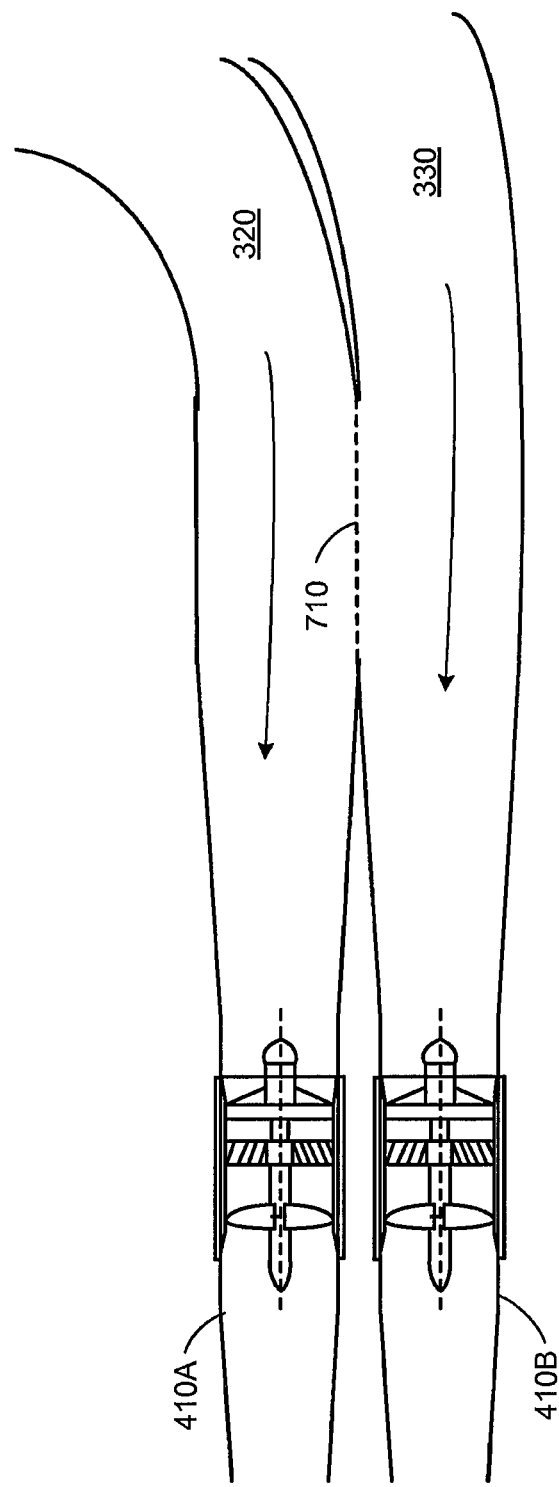
FIG. 7 depicts a first configuration for converting energy using multiple wind tunnels with a shunt in a first position.

FIG. 7 depicts a first wind-tunnel configuration for converting energy using multiple wind tunnels 410A and 410B with a shunt 710 in a first position. In the configuration of FIG. 7, the two channels 320 and 330 are isolated and the wind tunnels (and turbines therein) operate independently. Accordingly, incident wind captured by the exterior of the energy tower 100 is converted to electricity using the turbines of wind tunnel 410A while the downdraft wind created within the energy tower 100 is converted to electricity using the turbines of wind tunnel 410B.

Figure 8:
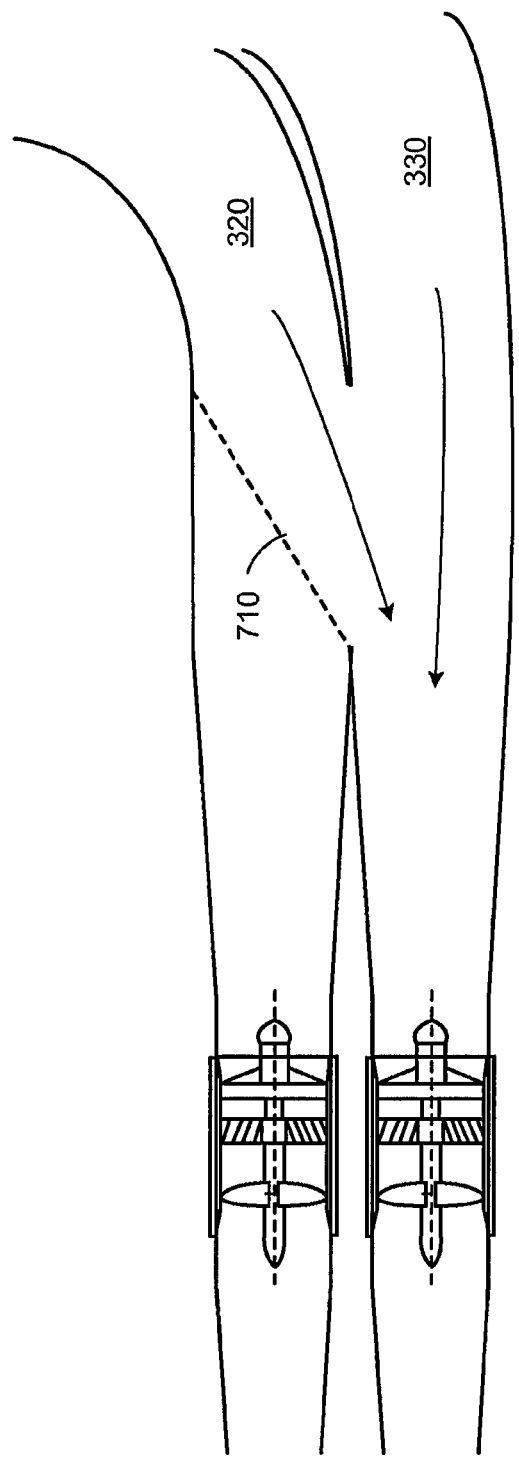
FIG. 8 depicts a second configuration for converting energy using multiple wind tunnels with a shunt in a second position.

Because wind-capturing turbines may be designed to operate at certain ranges of wind speed, it is to be appreciated by those skilled in the art in light of the present disclosure that there may be times, e.g., night time, where downdraft wind fed to wind tunnel 410B falls below a desired range, and incident wind captured by the external walls to the energy tower 100 and fed to wind tunnel 410A is also light. Rather than have the two separate wind tunnels 410A and 410B operate inefficiently, the shunt 710 may be reconfigured according to FIG. 8 such that the volume of wind from both channels 320 and 330 are combined and fed to a single wind tunnel 410B.

In various embodiments, this concept may be expanded beyond sharing or isolating captured wind energy between interior and exterior captured wind. For example, in some embodiments, there may be four or more wind tunnels having shunts to allow exterior captured wind and interior generated wind to be directed to any combination of wind tunnels. Also, there may be times when it is advantageous to feed externally captured wind to three wind tunnels, while directing internally generated wind to a single tunnel, while at different times it may be advantageous to reconfigure shunts to provide four wind tunnels for internally generated wind while allowing no wind tunnel for externally captured wind.

Additionally, in certain embodiments, captured wind from a particular external wind pocket/sail 212 (not shown in FIG. 6) may be released into a turbine reserved for another wind pocket/sail 212 through lateral shunts (also not shown).

In various embodiments, the addition of the various shunts can enable repair crews to service one wind tunnel while still enabling electricity to be generated by virtue of both externally captured wind and internally generated wind.

FIG. 9 is a flowchart outlining an exemplary operation for efficiently converting mechanically captured wind energy into electricity.

The process starts in step 910 where the available wind energy captured by an energy tower using the exterior wind pockets 212 discussed above are directly or indirectly measured. Next, in step 912, moisture may be controllably added to the captured wind to further accelerate the captured wind so as to optimize wind speed at the base of the wind pockets 212, which can be used to generate electric power using wind turbines and electric generators. Then, in step 914, the wind speed and/or energy of the captured and (optionally) accelerated wind may be measured or calculated. It is to be appreciated that step 912 may take into account data provided by one or both of steps 910 and 914. Control continues to step 920.

In step 920, the atmospheric conditions (e.g., temperature, wind speed, humidity, etc.) at the top of the energy tower are directly or indirectly measured. Next, in step 922, moisture may be controllably added to the air at the top of the energy tower to produce interior generated wind, which can be captured by turbines and generators at the base of the energy tower. Then, in step 924, the wind speed and/or energy of the captured and (optionally) accelerated wind may be measured or calculated. It is to be appreciated that step 922 may take into account data provided by one or both of steps 920 and 924. Control continues to step 930.

In step 930, various shunts are configured such that the captured wind from the exterior of the energy tower and the generated wind of the interior of the tower can be apportioned advantageously so as to keep turbines operating within an optimal or otherwise advantageous range. In various embodiments, one or more shunts are used to combine generated wind and captured wind to a single wind tunnel so as to enable the single wind tunnel to simultaneously convert the combined wind energy into electricity. In another series of embodiments, one or more shunts are used to separate generated wind into two or more wind tunnels such that each of the two or more wind tunnels simultaneously converts the generated wind energy into electricity. In another series of embodiments, one or more shunts are used to separate captured wind into two or more wind tunnels such that each of the two or more wind tunnels simultaneously converts the captured wind energy into electricity.

Figure 10:
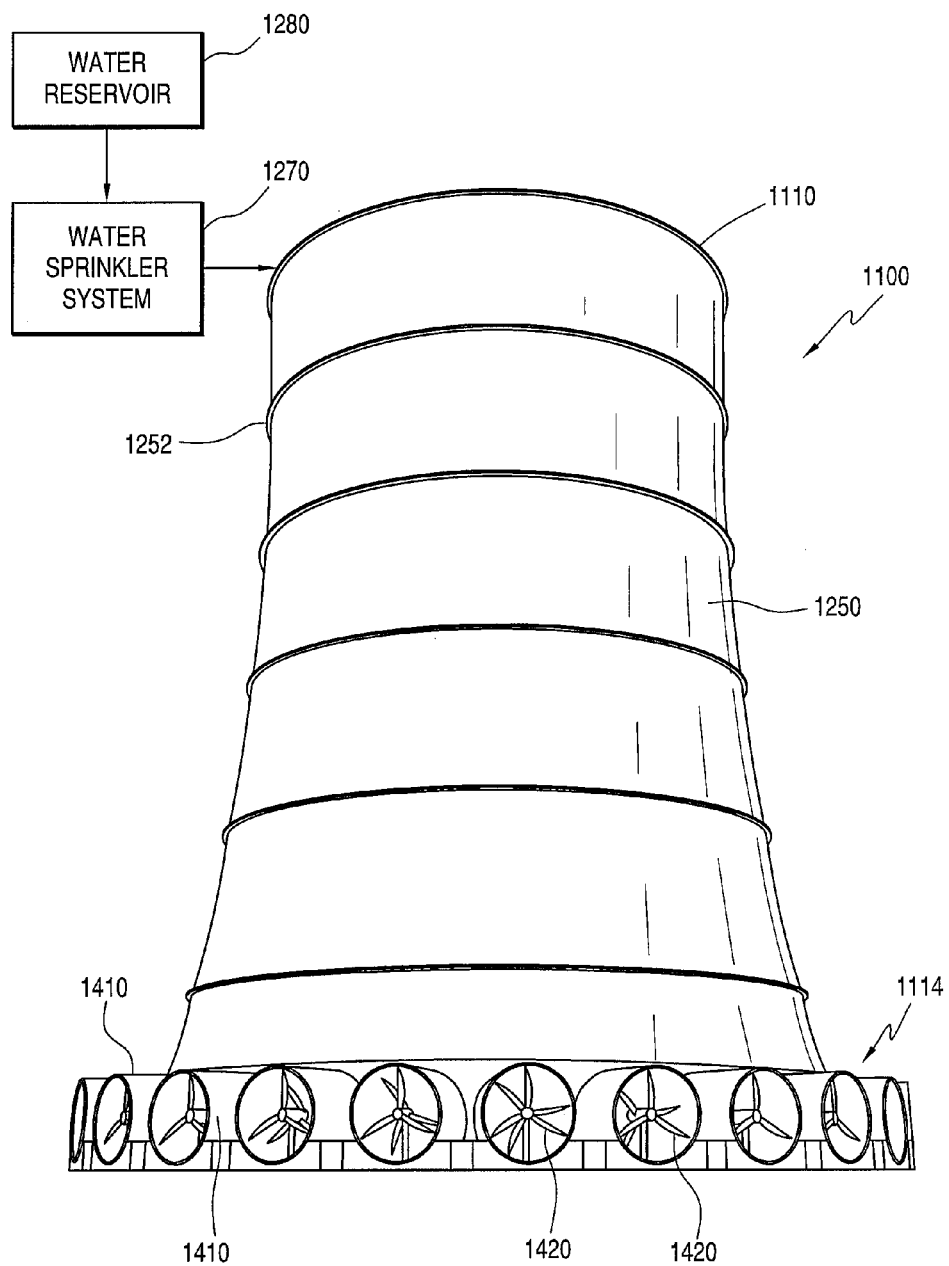
FIG. 10 is an isometric view of an energy tower having a hyperbolically shaped tower wall.

FIG. 10 is an isometric view of an energy tower having a hyperbolically shaped tower wall according to another embodiment of the invention. As shown in FIG. 10, the energy tower 1100 includes a base 1114. The base 1114 houses wind tunnels 1410 that extend radially and horizontally from the base 1114. Each wind tunnel 1410 houses one or more wind turbines 1420. A tower wall 1250 extends upward from the base 1114. An upper lip 1110 caps the top edge of the tower wall 1250. The lip, 1110, tower wall 1250 and base 1114 cooperate to cause moisture-laden air to accelerate internal to the tower wall 1250 into the individual wind tunnels 1410 housed by base 1114. As shown in FIG. 10, embodiments of the energy tower 1100 may be built without the incident wind capture features shown, for example, in FIGS. 2-3. Alternatively, embodiments of the tower shown in FIG. 10 may include such incident wind capture features.

Figure 11:
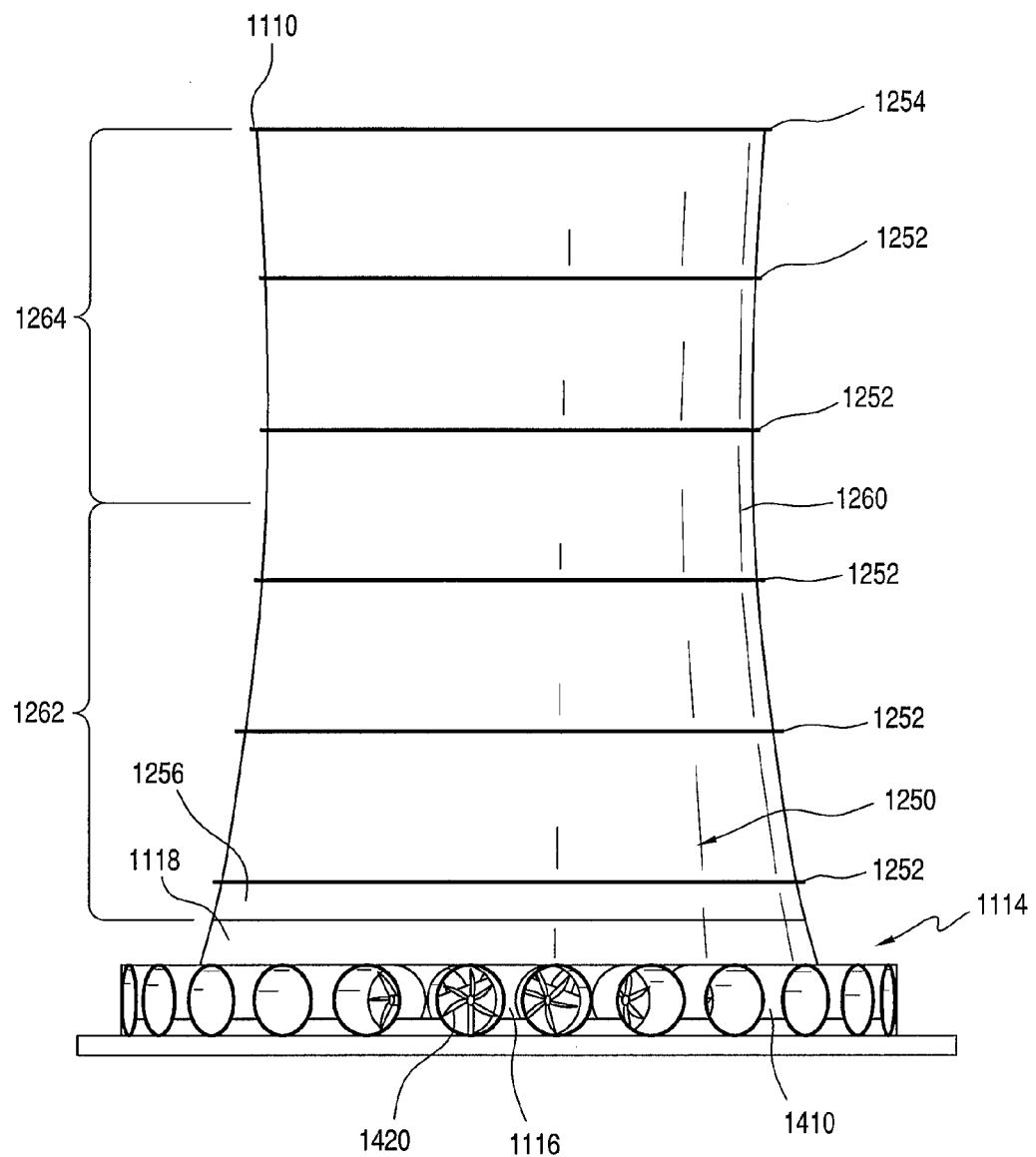
FIG. 11 is side view of a further embodiment of an energy tower having a hyperbolically shaped tower wall.

FIG. 11 is side view of a further embodiment of an energy tower having a hyperbolically shaped wall. As illustrated in this embodiment, an exterior surface of the base 1114 includes a first, generally vertical section 1116 from which the wind tunnels 1410 extend. The base exterior surface further includes an angled section 1118 that extends from the top of the first section 1116 and connects to a bottom edge 1256 of the tower wall 1250.

The tower wall 1250 extends upward from the top of base 1114. The tower wall is generally circular at a specific height. However, the profile of the tower wall 1250 varies from the bottom edge 1256 of the wall to the top lip 1110. The profile of the tower wall follows a generally hyperbolic shape. The tower wall has a certain diameter at the bottom edge 1256. The diameter of the tower wall narrows in a first section 1262, following the shape of a hyperbola to a throat 1260, which forms the narrowest portion of the tower wall. Proceeding upward from the throat 1260 in a second section 1264, the diameter of the tower wall widens, again following the shape of hyperbola to the upper lip 1110. The hyperbola defining the second section 1264 profile may be the same as the hyperbola defining the first section 1260 profile, or the two sections may be defined by different hyperbolas. Alternatively, the profile of the tower wall 1250 at sections one and two may be defined by other continuous shapes such as cones or parabolas.

In an embodiment of the energy tower, the geometry of the tower may be as follows: At grade elevation of +0 feet, the interior base diameter is +1,500 feet. At the throat 1260, the elevation is +1,500 feet, and the interior diameter is +1,200 feet. At the upper lip 1110, the elevation is +2,250 feet, and the inside diameter is +1,200 feet. Between approximately +0 feet and +100 feet, both the inside face and outside face 1116 of the tower will be vertical. Between approximately +100 feet and +200 feet, the inside face of the tower will be vertical, while the outside face 1118 of the tower will angled. Between approximately +200 feet and +1,500 feet, the inside face of the tower wall 1250 will follow the profile of a first hyperbola, and the outside face of the tower will be offset from the inside face by a generally constant wall thickness. Between approximately +1,500 feet and +2,250 feet, the inside face of the tower wall 1250 will follow the profile of a second hyperbola, different from the first hyperbola, and the outside face of the tower will be offset from the inside face by a generally constant wall thickness. The example above is illustrative only, and the dimensions of an energy tower in accordance with the present invention may vary depending upon a variety of factors, including the location, climate, prevailing winds, seismic and aesthetic considerations and other factors.

Figure 12:
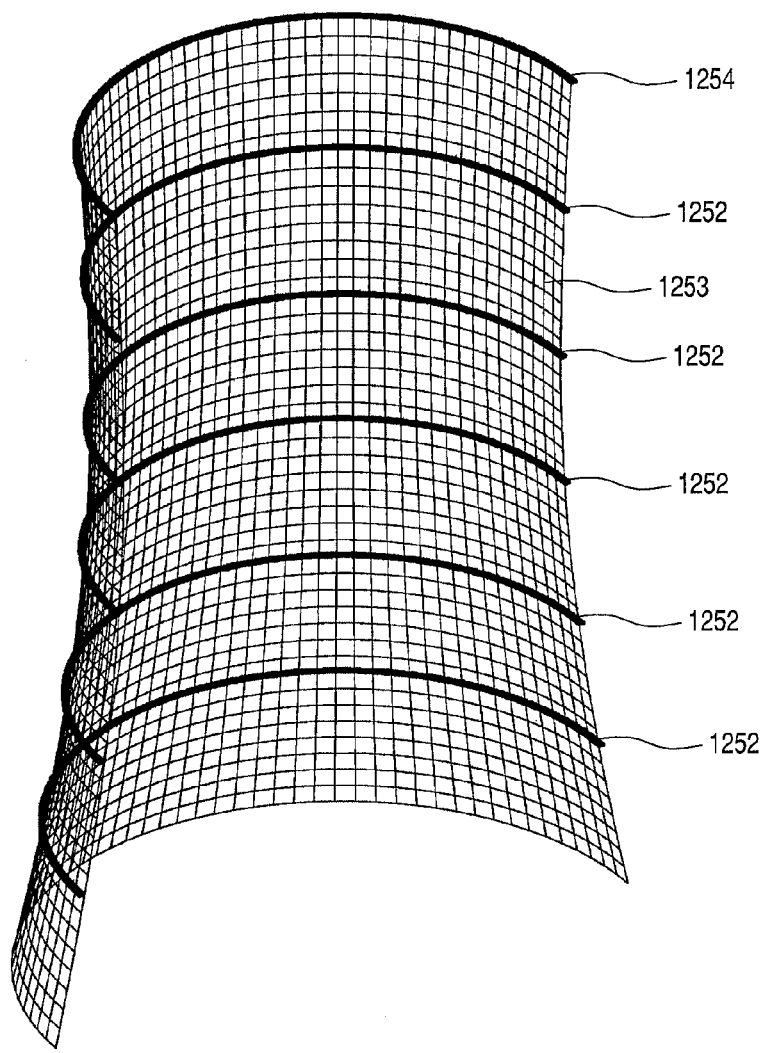
FIG. 12 is a cut-away isometric view of a reinforcing structure for the energy tower of FIG. 11.

The tower wall may be constructed of reinforced concrete or other suitable materials. Reinforcing rings 1252 are positioned at various heights, with a further reinforcing ring 1254 positioned at the upper lip 1110. The number and placement of these reinforcing rings depend upon a variety of factors, including the other materials used to construct the tower, the anticipated wind and seismic conditions of the tower site, as well as the dimensions of the tower. As shown in FIG. 12, the tower wall concrete structure may include further reinforcement material 1253 in addition to reinforcing rings 1252, 1254. This reinforcing material may be rebar or another reinforcing material as would be known to one of ordinary skill in the art.

Figure 13:
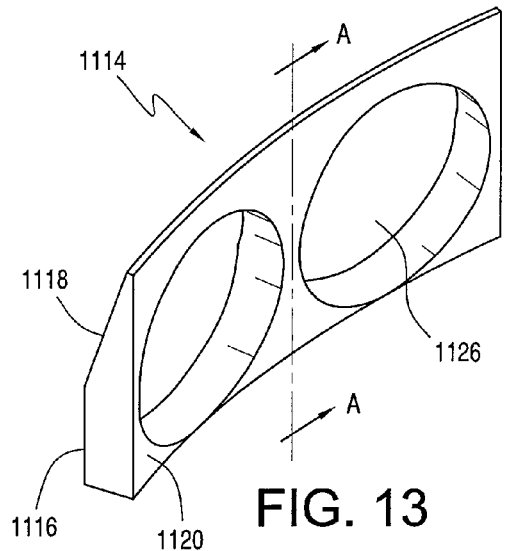
FIG. 13 is a cut-away, isometric view depicting wind-tunnel openings at the base of an energy tower.
Figure 14:
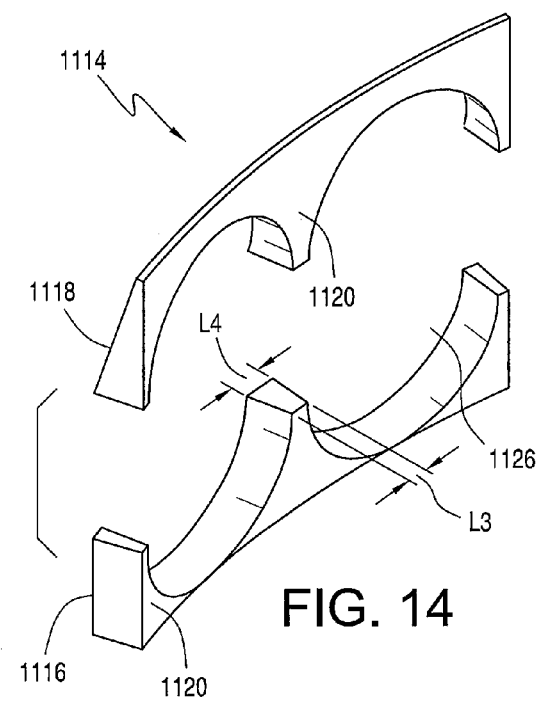
FIG. 14 is a cut-away isometric view of the wind-tunnel openings depicted in FIG. 13, showing a cross-section through the diameter of the wind-tunnel openings.
Figure 15:
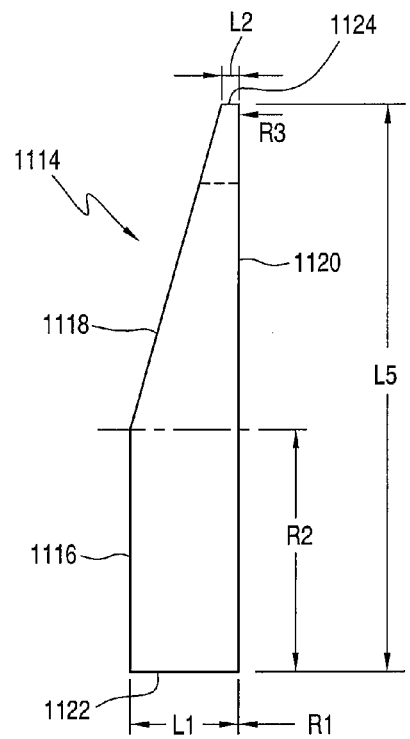
FIG. 15 is a cross-sectional side view along the line A-A of FIG. 14.

FIGS. 13-15 show the configuration of a portion of the base 1114 of an embodiment of the energy tower 1100. The base 1114 is generally circular and has a generally vertical inside wall 1120 with a radius R1 of 750 feet in one embodiment. However, the radius of the base, as well as other dimensions of the energy tower 1100 can be adjusted based on a variety of factors, including the climate and geography of the installation site as well as the desired power output. The base 1114 further includes a first or lower exterior wall section 1116 and an upper exterior wall section 1118. The lower section 1116 is generally vertical while the upper section 1118 is angled such that the base 1114 is thicker at a bottom end 1122 than at an upper end 1124. Alternatively, both the lower section 1116 and the upper section 1118 may be angled.

The bottom end 1122 may have a first thickness L1, while the top end has a narrower thickness L2. In some embodiments, the thickness L1 may be approximately six times the thickness L2. In particular, the thickness L1 may be approximately 36 feet, and the thickness L2 may be approximately 6 feet. The base has a total height of L5, which may be approximately 200 feet. While the base 1114 is illustrated in FIGS. 13-15 as being generally vertical, the base may also be tilted inwardly such that the radius R1 at a bottom end 1122 of the base 1114 is larger than a radius R3 at a top end 1124 of the base.

Generally circular openings 1126 extend radially through the base 1114 to house at least a portion of wind tunnels (1410) and have an interior radius R2. The radius R2 may be approximately 86 feet. While circular openings are shown, the openings may also be elongated or oval. Because of the curvature of the base, the openings 1126 are angled with respect to one another such that the distance L3 between two adjacent openings at the interior surface 1120 is less than the distance L4 between two adjacent openings at the exterior surface. L3 may be approximately 16 feet, and L4 may be approximately 25 feet. The angle between two adjacent openings will depend on the total number of openings in the base, which may be a function of various factors, including the climate and geography of the installation site as well as the desired power output.

Figure 16:
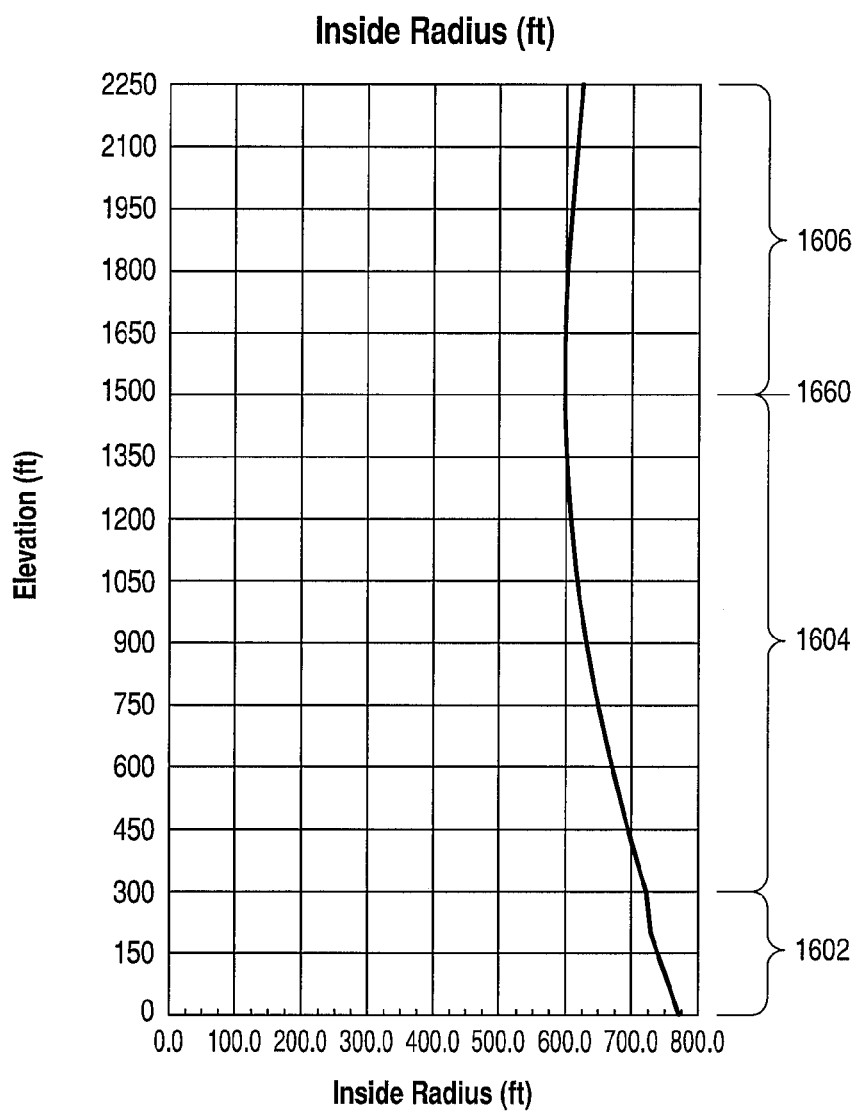
FIG. 16 is a graph depicting the inside radius of an energy tower having a hyperbolically shaped tower wall.

FIG. 16 is a graph depicting the inside radius of an embodiment of an energy tower having a hyperbolically shaped wall. The graph depicts three general sections of the energy tower: a base section 1602 extending from ground level to the top of a base; a first hyperbolic section 1604 extending from the top of the base to a throat 1660; and a second hyperbolic section 1606 extending from the throat 1660 to the top of the energy tower. The hyperbola defining the second section 1264 profile may be the same as the hyperbola defining the first section 1260 profile, or the two sections may be defined by different hyperbolas.

Figure 17:
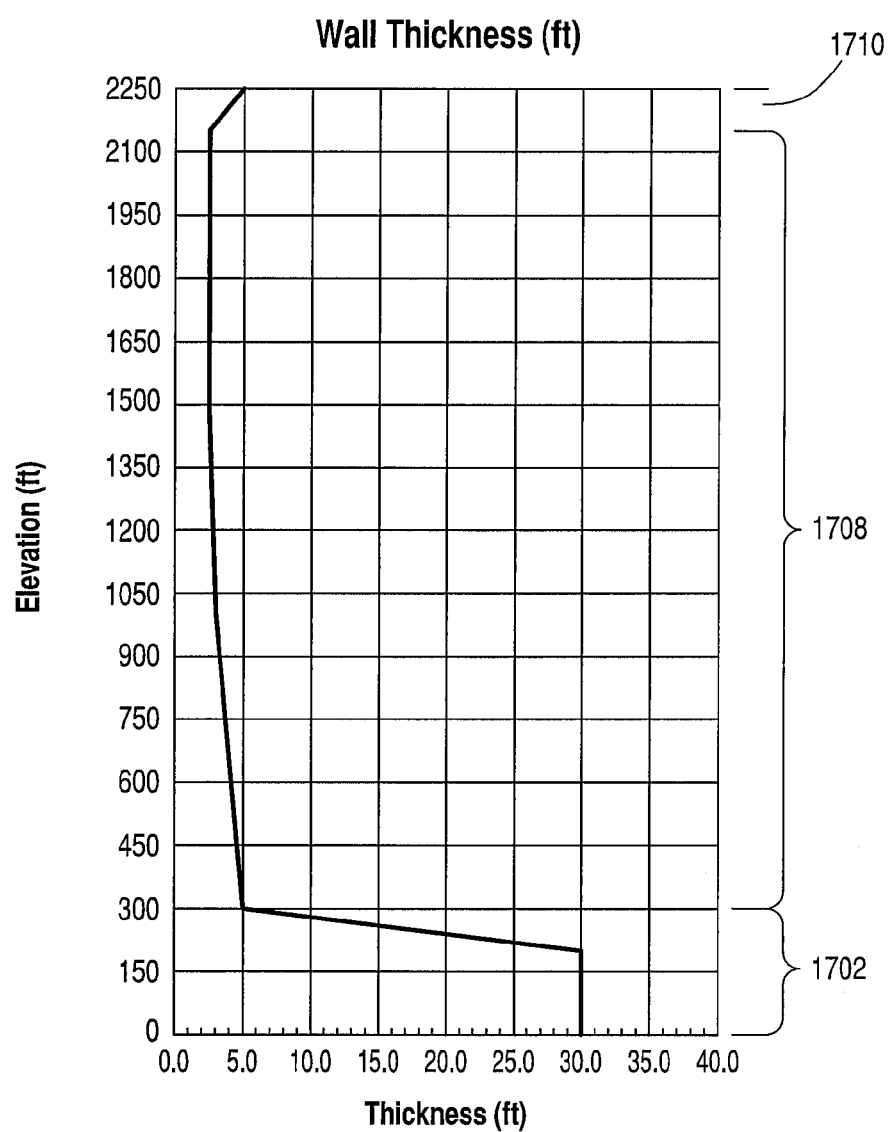
FIG. 17 is a graph depicting the wall thickness of an energy tower having a hyperbolically shaped tower wall.

FIG. 17 is a graph depicting the wall thickness of an embodiment of an energy tower having a hyperbolically shaped wall. The graph depicts three general sections of the energy tower: a base section 1702, a tower wall section 1708, and an upper lip section 1710. The thickness of the wall will depend on a variety of factors, including the particular construction materials and techniques used, climate and geographic constraints and other dimensions of the energy tower as would be understood by one of ordinary skill in the art.

The interior of the energy tower 1100 may include a diffuser, for example as shown by 380 in FIG. 3. The diffuser may be generally conically shaped. Alternatively, the diffuser may have a concave profile of constant or variable radius. In a further embodiment, the diffuser may be so shaped as to maintain a constant wind velocity along the surface of the diffuser. In an additional embodiment, the diffuser may be so shaped that the wind velocity along a surface of the lower portion of the tower wall 1250 is approximately equal to the wind velocity along a surface of the diffuser.

The upper lip 1110 of the tower may incorporate a water reservoir 1280. The reservoir may be in the form of a trough formed around the circumference of the upper lip 1110. The reservoir may be integrally formed within the tower wall itself. For example, the reservoir may be a ditch or trough recessed into a top surface of the tower wall. Alternatively, the reservoir may include one or more separate trough structures attached to the tower wall at or near the upper lip. In an embodiment, the reservoir is covered to prevent contamination of the water injection system or evaporation of the water. The reservoir may also be lined with an appropriate material to prevent leakage or absorption of water by the concrete of the tower wall. Water stored in the reservoir can be used to charge the water injection system of the invention which is similar to the water injection system 1270 shown in the embodiment of FIGS. 2 and 3.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A tower for producing energy, comprising
   a base extending upwardly from a foundation surface and having a central opening,
   a plurality of wind tunnels having a constant inner diameter connected with said central opening and extending radially from said base;
   a tower wall having a circular cross-sectional configuration extending upward from the base, said tower wall defining a hollow interior communicating with said base central opening, said tower wall including
      a first portion having a first interior radius;
      a throat portion positioned above the first portion and having a throat interior radius; and
      a second portion positioned above the throat portion and having a second interior radius,
      wherein the throat interior radius is less than both the first interior radius and the second interior radius and a thickness of said tower wall varies in accordance with a height of said tower wall at a given location along said tower wall so that said tower wall has a greatest thickness at said base, a smallest thickness between said base and an inlet to said tower and an intermediate thickness at said inlet to said tower;
   a water injection system configured to add moisture at a top of the tower to hot dry air so as to generate a downdraft of wind within the hollow interior of said tower wall which is delivered to said base central opening and to said wind tunnels;
   at least one turbine positioned within each wind tunnel for converting the wind into electricity.

2. The tower as defined in claim 1, wherein the tower wall is formed of concrete.

3. The tower as defined in claim 1, wherein the tower wall includes a reinforcing material.

4. The tower as defined in claim 1, and further comprising at least one reinforcing ring extending around a circumference of the tower wall.

5. The tower as defined in claim 1, wherein said base includes a centrally arranged diffuser extending upwardly through said central opening into the hollow interior of the tower.

6. The tower as defined in claim 1, and further comprising a water reservoir connected with said water injection system.

7. The tower as defined in claim 1, wherein a profile of said first interior radius follows a first hyperbolic shape.

8. The tower as defined in claim 7, wherein a profile of said second interior radius follows a second hyperbolic shape.

9. The tower as defined in claim 8, wherein the second hyperbolic shape is different from the first hyperbolic shape.

10. A method for producing electricity, comprising the steps of adding moisture to hot dry air at a top of an energy tower having an interior radius that varies depending upon a vertical distance from a base of the tower and a tower wall thickness that varies in accordance with a height of the tower so that said tower wall has a greatest thickness at said base, a smallest thickness between said base and an inlet to said tower and an intermediate thickness at said inlet to said tower;
   generating a downdraft of wind within the interior of the energy tower;
   directing the downdraft of wind into a plurality of wind tunnels extending radially outwardly from the bottom of the energy tower; and
   converting the downdraft of wind into electricity via turbines positioned within the wind tunnels.

11. The method as defined in claim 10, wherein a profile of a first portion of the interior of the energy tower follows a first hyperbolic shape.

12. The method as defined in claim 11, wherein a profile of a second portion the interior of the energy tower follows a second hyperbolic shape.

13. The method as defined in claim 12, wherein said directing step further comprises using a diffuser extending from a support surface of the energy tower to direct the downdraft of wind into the wind tunnel.

* * * * *